(12) United States Patent
Lin et al.

(10) Patent No.: US 8,180,004 B2
(45) Date of Patent: May 15, 2012

(54) METHOD FOR ESTIMATING AMOUNT OF DISTORTION IN CFO AND DCO, METHOD FOR COMPENSATING RECEIVED SIGNALS USING THE SAME, AND RECEIVER

(75) Inventors: Hai Lin, Osaka (JP); Katsumi Yamashita, Osaka (JP)

(73) Assignee: Osaka Prefecture University Public Corporation, Osaka (JP)

( * ) Notice: Subject to any disclaimer, the term of this patent is extended or adjusted under 35 U.S.C. 154(b) by 140 days.

(21) Appl. No.: 12/740,028

(22) PCT Filed: Nov. 5, 2008

(86) PCT No.: PCT/JP2008/070141
§ 371 (c)(1),
(2), (4) Date: Apr. 27, 2010

(87) PCT Pub. No.: WO2009/060874
PCT Pub. Date: May 14, 2009

(65) Prior Publication Data
US 2010/0246723 A1 Sep. 30, 2010

(30) Foreign Application Priority Data
Nov. 5, 2007 (JP) ................................. 2007-287771

(51) Int. Cl.
*H04L 1/00* (2006.01)
(52) U.S. Cl. ......... 375/346; 375/326; 375/344; 375/375
(58) Field of Classification Search .................. 375/319, 375/326, 344, 346, 375
See application file for complete search history.

(56) References Cited

U.S. PATENT DOCUMENTS

| 7,313,125 | B2 | 12/2007 | Hori et al. |
| 7,561,643 | B1* | 7/2009 | Piirainen ........................ 375/346 |
| 2004/0264432 | A1 | 12/2004 | Hori et al. |
| 2009/0111411 | A1* | 4/2009 | Koivunen et al. .......... 455/226.1 |

FOREIGN PATENT DOCUMENTS

| JP | 2001-244835 | 9/2001 |
| JP | 2003-032216 | 1/2003 |
| JP | 2004-304507 | 10/2004 |
| JP | 2008-236704 | 10/2008 |

(Continued)

OTHER PUBLICATIONS

Hai Lin, Xianbin Wang, K. Yamashita, "A Low-Complexity Carrier Frequency Offset Estimator Independent of DC Offset," IEEE Communications Letters, IEEE, vol. 12, No. 7, Jul. 2008, pp. 520-522.

(Continued)

*Primary Examiner* — Curtis Odom
(74) *Attorney, Agent, or Firm* — Greenblum & Bernstein, P.L.C.

(57) ABSTRACT

A received signal delivered through a transmission line can be compensated for carrier frequency offset and direct-current offset to improve the signal-to-noise ratio of the received signal, eventually resulting in an effective improvement in the error rate. The received signal has convoluted influences through the transmission line, so that observation of continual symbols of periodic pilot signals on the frequency axis shows just a phase shift by the carrier frequency offset. Therefore, the carrier frequency offset can be analytically found from the continual symbols of periodic pilot signals, thereby allowing the direct-current offset to be estimated and both the carrier frequency offset and the direct-current offset to be compensated for.

4 Claims, 7 Drawing Sheets

FOREIGN PATENT DOCUMENTS

WO 2008/0156133 12/2008

OTHER PUBLICATIONS

Hai Lin, H. M. Senevirathna, K. Yamashita, "Blind Estimation of Carrier Frequency Offset and DC Offset for OFDM Systems,", IEEE Transactions on Communications, vol. 56, No. 5, May 2008, pp. 704-707.

Hai Lin, H. M. S. Senevirathna, K. Yamashita, "Blind Carrier Frequency Offset Estimation for OFDM Systems with DC Offset," Global Telecommunications Conference, 2006, GLOBECOM '06, IEEE, 2006, pp. 1-5.

Hai Lin, T. Nakao, Weiming Lu, K. Yamashita, "Subspace-based OFDM Carrier Frequency Offset Estimation in the Presence of DC Offset," Communications, 2007, ICC '07. IEEE International Conference on, Jun. 2007, pp. 2883-2887.

P.H. Moose, "A Technique for Orthogonal Frequency Division Multiplexing Frequency Offset Correction Noise," IEEE Trans. Commun., vol. 42, No. 10, pp. 2908-2914, Oct. 1994.

M. Morelli and U. Mengali, "An Improved Frequency Offset Estimator for OFDM Applications," IEEE Communications Letters, vol. 3, pp. 75-77, Mar. 1999.

C. K. Ho, S. Sun, and P. He, "Low Complexity Frequency Offset Estimation in the Presence of DC offset," in Proc. IEEE ICC '03, pp. 2051-2055, May 2003.

S. Marsili, "DC Offset Estimation in OFDM Based WLAN Application," in Proc. IEEE GLOBECOM '04, Dec. 2004.

\* cited by examiner

METHOD FOR ESTIMATING AMOUNT OF DISTORTION IN CFO AND DCO, METHOD FOR COMPENSATING RECEIVED SIGNALS USING THE SAME, AND RECEIVER

TECHNICAL FIELD

The present invention relates to a method for estimating carrier frequency offsets (CFO) and DC offsets (DCO) in a receiver, a method for compensating received signals using estimated values, and a receiver for implementing the methods.

BACKGROUND ART

These years have seen the orthogonal frequency division multiplexing (OFDM) employed for various radio communication standards such as the DAB, the DVB, and the IEEE 802.11a WLAN. The OFDM scheme has partially overlapped subcarrier spectra and is thus extremely vulnerable to carrier frequency offsets (CFO). Thus, the CFO has to be estimated and compensated for (Non-Patent Document 1). On the other hand, recent demands for inexpensive terminals have been met by employing the direct conversion receiver (DCR). However, the DCR can cause additional analog signal loss such as DC offset (DCO) or I/Q imbalance flicker noise. Only the most serious loss, i.e., the DCO, is herein taken into account, while other loss factors are assumed to be negligible.

The estimation of CFO in the OFDM system has been studied thoroughly because it is critical in maintaining the orthogonality of subcarriers. Some of literatures on those studies discuss the compensation for CFO and DCO in their simultaneous presence. The studies can be classified into two types. One is concerned with the method using pilot signals (Non-Patent Documents 3 and 4), and the other with the blind method. The approach using the blind method requires a thorough search in the target band based on calculations to estimate the CFO, leading to its complexity and the amount of calculations that is too much to be implemented. On the other hand, another approach which employs the pilot signal, except for the maximum likelihood method (ML), typically has a merit of reducing the complexity by making use of a special structure of the pilot signal. For this reason, we focus on an ordinary periodic pilot signal (PP). The mutual relation between PPs can provide a simple method for estimating the CFO in the absence of the DCO (Non-Patent Documents 1 and 2). On the other hand, the pilot signal in the presence of CFO and DCO has been studied in the literatures (Non-Patent Documents 3 and 4).

[Non-Patent Document 1] P. H. Moose, "A technique for orthogonal frequency division multiplexing frequency offset correction noise," IEEE Trans. Commun., vol. 42, pp. 2908-2914, October 1994.

[Non-Patent Document 2] M. Morelli and U. Mengali, "An improved frequency offset estimator for OFDM applications," IEEE Communi. Lett., vol. 3, pp. 75-77, March 1999.

[Non-Patent Document 2] C. K. Ho, S. Sun, and P. He, "Low complexity frequency offset estimation in the presence of DC offset," in Proc. IEEE ICC '03, pp. 2051-2055, May 2003.

[Non-Patent Document 4] S. Marsili, "DC offset estimation in OFDM based WLAN application," in Proc. IEEE GLOBECOM—04, December 2004.

DISCLOSURE OF THE INVENTION

Problems to be Solved by the Invention

In Non-Patent Document 3, the amount of DCO is first roughly estimated, and the resulting estimated value of the amount of DCO is subtracted from the correlation value between the pilot signals, thereby providing the estimated value of CFO. The estimated value of CFO is known to be biased (in which statistical errors cannot be reduced to zero) and valid only for small CFOs. On the other hand, in Non-Patent Document 4, the best linear unbiased estimator (BLUE) is employed to estimate the DCO. Nevertheless, the CFO is modeled as a random value. However, in general, since the CFO is not a random value in the process of estimation (Non-Patent Document 3), the imperfection of the model may cause degradation in accuracy of the estimation model. That is, there is no conventional method for determining the values of DCO and CFO with accuracy.

Means for Solving the Problems

The present invention was developed in view of these problems. Under the condition that periodic pilot signals (hereinafter also referred to as "PP") are transmitted in a series of multiple symbols, the invention makes use of the fact that there is a shift between continual symbols of the second PP onward by the amount of the carrier frequency offset.

That is, the present invention provides a method for estimating an amount of distortion, including the steps of:
receiving a transmitted signal to acquire a received signal;
demodulating the received signal;
converting the demodulated signal into a digital signal;
acquiring (K+L) pieces of data from a portion corresponding to a pilot signal of the digital signal, where K is the number of samples included in one pilot signal symbol of the received signal, and L is DK with D being a predetermined integer value; and
determining an estimated value of CFO based on Equation (100), where the vector $r_1$ represents L pieces of data starting from the beginning of the acquired data, and the vector $r_2$ represents L pieces of data starting from the (K+1)th data from the beginning of the acquired data.

[Equation 1]
$$\Delta f = \frac{f_s}{2\pi K} \arg\{R_p\} \tag{100}$$

where Rp is derived from Equation (13), and fs is the sampling frequency.

[Equation 2]
$$R_p = \frac{1}{L} r_1^{\mathcal{H}} r_2 - \frac{1}{L^2} r_1^{\mathcal{H}} 11^T r_2. \tag{13}$$

Furthermore, the vector 1 is an (L×1) vector with all the elements being one.

The present invention also provides another method for estimating an amount of distortion, including the steps of:
receiving a transmitted signal to acquire a received signal;
demodulating the received signal;
converting the demodulated signal into a digital signal;
acquiring (K+L) pieces of data from a portion corresponding to a pilot signal of the digital signal, where K is the number of samples included in one pilot signal symbol of the received signal, and L is DK with D being a predetermined integer value; and determining an estimated value of DCO based on Equation (14), where the vector $r_1$ represents L pieces of data starting from the beginning of the acquired data, and the vector $r_2$ represents L pieces of data starting from the (K+1)th data from the beginning of the acquired data.

[Equation 3]

$$\hat{d} = \frac{r_1^H r_1 1^T r_2 - r_1^H r_2 1^T r_1}{(L r_1^H - r_1^H 11^T)(r_1 - r_2)}. \quad (14)$$

Furthermore, the vector 1 is an (L×1) vector with all the elements being one.

Furthermore, the present invention provides a reception method, including the steps of:

receiving a transmitted signal to acquire a received signal;
demodulating the received signal;
converting the demodulated signal into received complex data;
compensating for the estimated DCO value determined according to claim 2; and
compensating for the estimated CFO value determined according to claim 1.

The present invention also provides a receiver including:
an antenna for receiving a transmitted signal having a pilot signal portion to acquire a received signal;
an amplifier connected to the antenna for outputting the received signal;
a complex demodulator connected to the amplifier for demodulating the received signal;
a switch connected to the complex demodulator for sampling the demodulated received signal and outputting received complex data; and
a controller connected to the switch for receiving the received complex data and outputting compensated received data obtained by removing CFO and DCO from the received complex data, wherein
the controller acquires L pieces of data starting from the (K+1)th data of a pilot signal as a vector $r_1$, and L pieces of data starting from the (2K+1)th data of the pilot signal as a vector $r_2$,
the controller determines a compensated CFO value based on Equation (100),
the controller determines a compensated DCO value based on Equation (14), and
the controller compensates the complex input data using the compensated DCO value and the compensated complex input data using the compensated CFO value, thereby determining the compensated received data.

[Equation 4]

$$\Delta f = \frac{f_s}{2\pi K}\arg\{R_p\} \quad (100)$$

where Rp is derived from Equation (13). Furthermore, $f_s$ is the sampling frequency, and K is the number of samples in one symbol.

[Equation 5]

$$R_p = \frac{1}{L} r_1^H r_2 - \frac{1}{L^2} r_1^H 11^T r_2. \quad (13)$$

[Equation 6]

$$\hat{d} = \frac{r_1^H r_1 1^T r_2 - r_1^H r_2 1^T r_1}{(L r_1^H - r_1^H 11^T)(r_1 - r_2)}. \quad (14)$$

Furthermore, the vector 1 is an (L×1) vector with all the elements being one.

EFFECTS OF THE INVENTION

The present invention shows that a potential relation between received PPs can serve to completely remove the influence of DCO to estimate CFO. As a result, we can suggest a method for estimating a non-biased CFO in the absence of DCO, thereby achieving the same performance as in the absence of DCO. Furthermore, an estimate of the DCO can also be obtained at the same time.

DESCRIPTION OF REFERENCE NUMERALS

1 transmitter
2 signal source
3 pilot signal generator
4 synthesizer
5 frequency converter
6 transmitter amplifier
7 transmitter antenna
10 receiver
11 receiver antenna
12 receiver amplifier
13, 14 multiplier
15 local transmitter
16 phase converter
17, 18 lowpass filter
19, 20 switch
22 adder
23 subtractor
24 multiplier
25 imaginary unit
28 compensated value calculation section
30 controller

BEST MODE FOR CARRYING OUT THE INVENTION

Boldface letters are used herein to denote a matrix (row vector). Superscripts "H", "T", "*", and "+" (a cross mark) will represent the Hermitian matrix, transpose matrix, conjugate matrix, and pseudo-inverse matrix (dagger), respectively. Furthermore, a matrix denoted with a boldface letter in an equation will be referred to as the "matrix r", and the row vector as the "vector r".

In an OFDM system having N subcarriers, a bandwidth B is divided into N subcarriers at frequency intervals of $f_0=B/N$. Then, CFO ($\Delta f$) is typically normalized with $f_0$.

Figure 1:
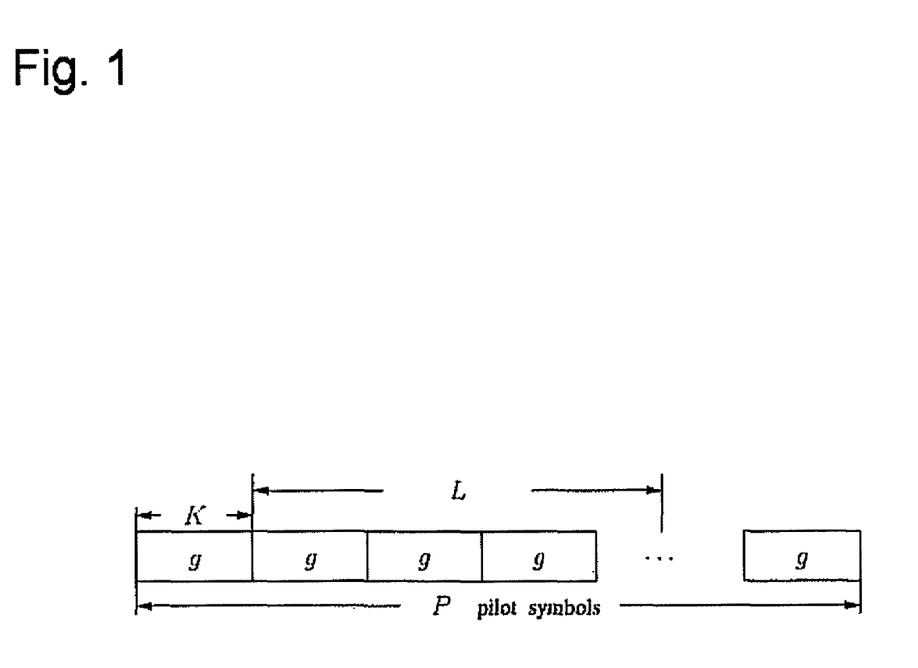
FIG. 1 is a view illustrating a pilot signal.

FIG. 1 shows a PP (pilot signal) with P symbols to be transmitted. Here, each symbol has K samples. The PP is considered to be an OFDM symbol with subcarriers arrayed at equal intervals in the transmission space. Typically, N=MK and M are a positive integer.

Note that this embodiment will be described with reference to an OFDM signal; however, the present invention is not limited to the OFDM signal. If the OFDM signal is unavailable, subcarriers may not be present. However, the present invention is still applicable so long as a pilot signal having K samples exists. In that case, it can be assumed that N (=MK) subcarriers are present where M is a positive integer, preferably, a positive integer equal to 2 or greater. As will be described later, M and N can be eliminated when an estimated CFO value is determined in terms of Δf (Hz). Therefore, the value of M can be set to any positive integer.

Each symbol in the PP is a cyclic prefix for an adjacent symbol, and thus, the received pilot signal is still cyclic.

After a channel convolution, we obtain an nth received pilot signal sample (as shown below), where $\epsilon$ is defined as an unknown normalized CFO.

[Equation 7]

$$r(n)=s(n)+z(n), \quad (1)$$

Here, s(n) is a received signal that has been affected by CFO and expressed as below.

[Equation 8]

$$s(n)=e^{-j\phi}s(n+K), n>K$$

Furthermore, $\phi$ is a phase representation of CFO and expressed as below.

[Equation 9]

$$\phi=2\pi\epsilon K/N$$

where z(n) has a variance of $\sigma^2 z$ and represents a sample of white Gaussian noise (hereinafter also referred to as the "AWGN") with zero mean added thereto.

Then, the correlation of the received pilot signal can be determined by Equation (2) below, thereby providing an estimated CFO value as follows. Note that here, L=DK where D is a design parameter.

[Equation 10]

$$R = \frac{1}{L}\sum_{l=1}^{L} r^*(K+l)r(2K+l), \quad (2)$$

[Equation 11]

$$\hat{\epsilon} = \frac{M}{2\pi}\arg\{R\}$$

Here, $\epsilon$ that can be estimated lies in the range shown below.

[Equation 12]

$$\epsilon \in (-M/2, M/2)$$

Assuming the presence of d or an unknown DCO, the received nth pilot sample is given as below.

[Equation 13]

$$r(n)=s(n)+d+z(n), \quad (3)$$

This leads to the following equation.

[Equation 14]

$$R=e^{j\phi}A+|d|^2+R_{s,d}+R_{z,d}+R_z, \quad (4)$$

Here, A, $R_{s,d}$, $R_{z,d}$, and $R_z$ are expressed as below.

[Equation 15]

$$A = \frac{1}{L}\sum_{l=1}^{L}|s(K+l)|^2$$
$$R_{s,d} = dS_1 + d^*S_2$$
$$R_{z,d} = dZ_1 + d^*Z_2$$

Thus, $R_z$ is expressed as below.

[Equation 16]

$$R_z = \frac{1}{L}\sum_{l=1}^{L} s^*(K+l)z(2K+l) + \frac{1}{L}\sum_{l=1}^{L} z^*(K+l)s(2K+l) + \frac{1}{L}\sum_{l=1}^{L} z^*(K+l)z(2K+l), \quad (5)$$

Note that here, $S_1$, $S_2$, $Z_1$, and $Z_2$ are given as below.

[Equation 17]

$$S_1 = \frac{1}{L}\sum_{l=1}^{L} s^*(K+l)$$
$$S_2 = \frac{1}{L}\sum_{l=1}^{L} s(2K+l)$$
$$Z_1 = \frac{1}{L}\sum_{l=1}^{L} z^*(K+l)$$
$$Z_2 = \frac{1}{L}\sum_{l=1}^{L} z(2K+l)$$

[Equation 18]

$$R_h = R - \left|\frac{1}{L+K}\sum_{l=1}^{L+K} r(K+l)\right|^2 \quad (6)$$

Non-Patent Document 3 indicates that there is a bias in the estimation of CFO based on Equation (4), thus presenting a to solution to substituting R into Equation (6). However, the estimation of the square of the absolute value of d is based on the time-average (TDA), being thus applied to greater CFOs less successfully. Furthermore, even in the presence of complete information regarding the square of the absolute value of d, the result of estimation will be biased with $R_{s,d}$.

<3. Simultaneous Estimation of CFO and DCO>

In practical services, there may exist a large CFO at the very beginning of reception. It is naturally desirable to develop an enhanced CFO estimation method for estimation even in the presence of DCO. In this section, we suggest a non-biased CFO estimation method. The estimation method can completely eliminate the influence of DCO.

3. Algorithm

The (L+K) samples of Equation (2) can be organized into two (L×1) vectors as below.

[Equation 19]

$$r_1 = [r(K+1), \ldots, r(K+L)]^T, \quad (7)$$

$$r_2 = [r(2K+1), \ldots, r(2K+L)]^T. \quad (8)$$

From Equation (3), we get the following equation in the absence of AWGN.

[Equation 20]

$$r_2 - d \cdot 1 = e^{j\phi}(r_1 - d \cdot 1), \quad (9)$$

Here, the matrix 1 is an (L×1) vector with all the elements being one. Needless to say, Equation (9) can be rewritten into Equation (10) as below.

[Equation 21]

$$r_2 = [\, r_1 \ \ 1 \,] \begin{bmatrix} e^{j\phi} \\ (1-e^{j\phi})d \end{bmatrix}, \quad (10)$$

This implies a linear least-squares problem. For L>1, the analytical solution is given by Equations (11) and (12).

[Equation 22]

$$\begin{bmatrix} e^{j\phi} \\ (1-e^{j\phi})\hat{d} \end{bmatrix} = [\, r_1 \ \ 1 \,]^{+} r_2 \quad (11)$$

$$= c \begin{bmatrix} L r_1^H r_2 - r_1^H 1 1^T r_2 \\ r_1^H r_1 1^T r_2 - r_1^H r_2 1^T r_1 \end{bmatrix} \quad (12)$$

Here, c is expressed as below.

[Equation 23]

$$c = 1/(L r_1^H r_1 - r_1^H 1 1^T r_1)$$

C is a positive real scalar having nothing to do with the estimation of φ. Furthermore, the right shoulder of the first term on the right-hand side of Equation (11) has a cross mark, which denotes a pseudo-inverse matrix. From Equation (12), a hat φ representing the CFO can be determined independently of the hat d representing the DCO.

As a result, we obtain an estimated CFO value hat $\epsilon_p$ as shown below.

$$\hat{\epsilon}_p = \frac{M}{2\pi} \arg\{R_p\} \quad \text{[Equation 24]}$$

Here, Rp is a complex number and expressed by Equation (13).

[Equation 25]

$$R_p = \frac{1}{L} r_1^H r_2 - \frac{1}{L^2} r_1^H 1 1^T r_2. \quad (13)$$

Note that M is a positive integer that satisfies N=MK, where N is the number of subcarriers and K is the number of samples in one symbol. The hat $\epsilon_p$ is a normalized estimated CFO value and expressed in the form including an integer M that can be arbitrarily set. Using the unit of frequency (Hz), this can be expressed as in Equation (100) below by taking into account the hat $\epsilon_p$ being Δf/f₀ and Nf₀ being the bandwidth B (more precisely, the sampling frequency $f_s$).

[Equation 26]

$$\Delta f = \frac{f_s}{2\pi K} \arg\{R_p\} \quad (100)$$

That is, the CFO can be determined by the main angle of the complex number Rp (the angle between the real part and the imaginary part) that is found by the sampling frequency fs, the number K of samples in symbols, and Equation (13).

This immediately makes it possible to estimate the DCO as in Equation (14) when ε is not zero.

[Equation 27]

$$\hat{d} = \frac{r_1^H r_1 1^T r_2 - r_1^H r_2 1^T r_1}{(L r_1^H - r_1^H 1 1^T)(r_1 - r_2)}. \quad (14)$$

3.2 Performance Analysis

Since the last L−K element column of the matrix $r_1$ is the same as the first L−K element column of the matrix $r_2$, Equation (13) and Equation (6) have the same amount of calculations. The secondary form of Equation (13) can be shown as below.

[Equation 28]

$$R_p = R - \overline{R} \quad (15)$$

Here, the relation expressed by Equation (16) holds true.

[Equation 29]

$$\overline{R} = e^{j\phi}\overline{A} + |d|^2 + R_{s,d} R_{z,d} \overline{R}_z, \quad (16)$$

Equation (17) also holds true.

[Equation 30]

$$\overline{A} = \left| \frac{1}{L} \sum_{l=1}^{L} s(K+l) \right|^2, \quad (17)$$

$$\overline{R}_z = S_1 Z_2 + Z_1 S_2 + Z_1 Z_2.$$

Here, the term with a horizontal bar drawn above "A" is referred to as "bar A".

Substituting Equations (4) and (16) into Equation (15) gives Equation (18).

[Equation 31]

$$R_p = e^{j\phi}(A - \overline{A}) + R_z - \overline{R}_z, \quad (18)$$

Here, all the terms that include d or unknown DCO are eliminated.

In other words, this CFO estimation method is independent of DCO. Taking into account that noise is zero average AWGN can provide such a result that bar Rz is generally zero for a sufficiently large L. Knowing that A and bar A are a positive real scalar, Equation (18) can be rewritten into Equation (19).

[Equation 32]

$$R_p \approx e^{j\phi} A \left[ 1 - \frac{\bar{A}}{A} + \frac{e^{-j\phi} R_z}{A} \right]. \quad (19)$$

Treating the PP as an OFDM symbol will tell that the bar A is proportional to the inter-carrier interference which is caused by the CFO present at a DC subcarrier point. Since no signal is carried on DC and 2×(M−1) adjacent subcarriers, the "A" can be appropriately assumed to be sufficiently larger than the bar A.

As in Non-Patent Document 2 in which the SN ratio (SNR) is described to be sufficiently greater than one, the real and complex elements of exp (−jϕ)*Rz are sufficiently smaller than "A" (with a high probability). Here, the "*" means a multiplication operation.

Therefore, when the SNR is high and Equation (101) holds true, an approximation can be realized by Equation (20).

[Equation 33]

$$|\hat{\varepsilon}_p - \varepsilon| \ll \frac{M}{2\pi} \quad (101)$$

[Equation 34]

$$\hat{\varepsilon}_p - \varepsilon \approx \frac{M}{2\pi} \cdot \frac{\text{Im}\{e^{-j\phi} R_z\}}{A}. \quad (20)$$

Eventually, the following equation was obtained.

[Equation 35]

$$E(\hat{\varepsilon}_p - \varepsilon) = 0$$

Accordingly, the suggested CFO estimation method is free of bias and the variance can be obtained from Equation (21).

[Equation 36]

$$\text{var}\{\hat{\varepsilon}_p\} = \left(\frac{M}{2\pi}\right)^2 \frac{1}{D^2 \cdot K \cdot SNR}, \quad (21)$$

This is the same as the variance in the case of the DCO being zero in Non-Patent Document 2.

Since the term containing "d" is eliminated in Equation (10), the method for estimating DCO according to Equation (14) fails to estimate it in the absence of CFO. Fortunately, in a typical case, the DC subcarrier of the OFDM system will not carry signals. Therefore, if necessary, since the DCO with zero CFO is essentially harmless, the TDA can be carried out on the PP or the OFDM symbol carrying typical information, thereby estimating the DCO with ease.

Furthermore, once the CFO is estimated, the DCO can be determined based on another method. More specifically, the following method can be used. Suppose that a matrix $F_N$ is an (N×N) inverse Fourier transform matrix. One column of the matrix $F_N$ corresponds to one subcarrier of an OFDM signal with N subcarriers. Here, let "i" be the column number. Assume also that 1≦I≦N.

Even if the target signal is not an OFDM signal, the periodic pilot signal having M symbols (one symbol is made up of K samples) can be considered to be an OFDM signal having N=MK subcarriers.

[Equation 37]

$$r = [r(K+1), \ldots, r(K+N)]^T$$

This OFDM signal can be considered to use "i" subcarriers. More specifically, it uses the subcarriers as below.

[Equation 38]

$$i = M+1, 2M+1, \ldots, (K-1)M+1$$

That is, those other than "i" subcarriers can be considered to be a null subcarrier for carrying nulls. The columns of the matrix $F_N$ corresponding to the null subcarriers are combined into one matrix V. That is, the matrix V will contain column vectors corresponding to the null subcarriers. The vector r or a received signal gives the relation shown below in the absence of CFO, DCO, and noise.

[Equation 39]

$$V^H r = 0$$

This is because the multiplication by the matrix $V^H$ from the left-hand side corresponds to the reproduction of the signal from the null subcarriers of the vector r or the received signal. Accordingly, in the presence of only CFO, the following relation holds true.

[Equation 40]

$$V^H \Gamma^H(\epsilon) r = 0$$

Here, the matrix $\Gamma^H(\epsilon)$ is an (N×N) diagonal matrix and expressed as below.

[Equation 41]

$$\Gamma^H(\epsilon) = \text{diag}(1, e^{-j2\pi\epsilon 1/n}, \ldots, e^{-j2\pi\epsilon(N-1)/N})$$

The matrix $\Gamma^H(\epsilon)$ (=matrix $\Gamma(-\epsilon)$) produces a phase shift by $\epsilon$ or the normalized CFO. That is, the above equation means that cancelling the CFO present in the received signal and reproducing the null subcarrier results in zero.

Now, in the presence of CFO and DCO, the following relation holds true. Note that the vector $1_N$ is an (N×1) column vector with all the elements being one.

[Equation 42]

$$V^H \Gamma^H(\epsilon) r = d V^H \Gamma^H(\epsilon) 1_N$$

The DCO is not reduced to zero even when being operated with the matrix $\Gamma^H(\epsilon)$, leaving only DCO components on the right-hand side. Here, the vector 1 can be calculated in advance as above. The $V^H$ is part of the $F_N$ and thus can also be calculated in advance. On the other hand, the CFO can be determined from Equation (100) of the present invention, thus leaving only "d" or the DCO as an unknown in the above equation. Accordingly, once the CFO is estimated, the DCO can be estimated based on the above equation. More specifically, the DCO can be determined from the equation below.

[Equation 43]

$$\hat{d} = x^\dagger y \quad (102)$$

In the equation above, the vector x and the vector y are an (N×1) column vector as expressed below.

[Equation 44]

$$x = V^H \Gamma^H(\hat{\epsilon}_p) 1_N$$

$$y = V^H \Gamma^H(\hat{\epsilon}_p) r \quad (103)$$

Note that the quasi inverse matrix of x is $(x^H x)^{-1} x^H$, where the vector x is denoted simply by "x", and since $(x^H x)$ is scalar, the DCO can be found without determining the quasi inverse matrix.

Figure 2:
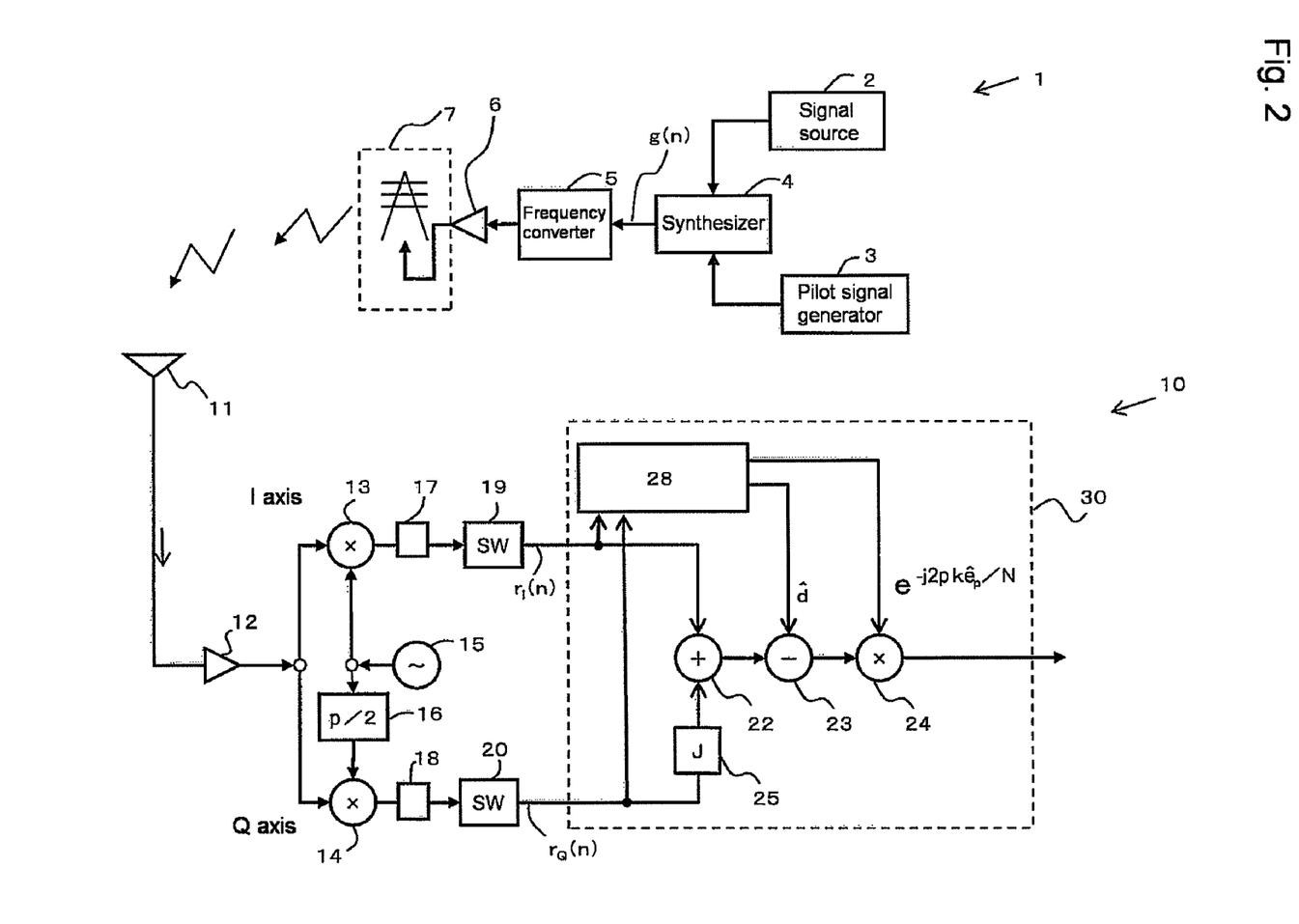
FIG. 2 is a view illustrating the configuration of a transmitter and a receiver according to the present invention.

A description will now be made in detail to a practical use of the present invention. FIG. 2 shows the configuration of the present invention. A transmitter 1 for transmitting signals may be a broadcast station or privately owned transmitter. In the present invention, the transmitter 1 includes a signal source 2, a pilot signal generator 3, a synthesizer 4, and a frequency converter 5. The transmitter 1 may also include an output amplifier 6 and an antenna 7. Here, the pilot signal transmits L or more symbols of K samples. Furthermore, the pilot signal is time multiplexed with the original signal emitted from the signal source. This is because the present invention requires such a period in which the receiver side has to receive only pilot signals. The output g(n) from the synthesizer 4 is transmitted via the frequency converter 5. The frequency converter 5 may also include a coding function.

On the other hand, a receiver 10 includes an antenna 11, an amplifier 12, a frequency converter and a filter (17, 18), a switching element (19, 20), and a controller 30. The frequency converter is a complex frequency converter. Typically, it includes a local transmitter LO (15), a multiplier (13, 14), and a phase converter 16.

The receiver 10 receives a signal into which the channel response and g(n) or the transmitted signal are convoluted through integration and affected by CFO. The output from the amplifier 12 is divided into the I branch (I axis) and the Q branch (Q axis). The I branch side signal is multiplied at the multiplier 13 by the carrier signal from the local transmitter LO 15. On the other hand, the Q branch side signal is multiplied at the multiplier 14 by the signal with the carrier signal of the local transmitter LO being phase shifted by $\pi/2$.

The I branch and Q branch signals pass through the low-pass filters (17, 18), respectively, to thereby remove unwanted high-frequency components. Thereafter, the signals are converted into digital signals at an AD converter (19, 20) that has a sufficient sampling frequency. The I branch and Q branch signals are each supplied to the controller 30.

A description will now be made to the processing by the controller 30. FIG. 2 is illustrated as if there are processing sections each corresponding to each processing in the controller 30; however, all the processing is mainly performed by software. As a matter of course, dedicated hardware may also be implemented to carry out the processing. Note that hereinafter those signals digitized on the I branch side will be referred to as the I data, while the signals digitized on the Q side branch will be referred to as the Q data. Furthermore, the I data and the Q data to be supplied to the controller 30 is collectively called the received complex data. The received complex data is affected by self-demodulation in the demodulation step by the local oscillator, and has a superimposed DCO. Upon reception of the Q data and the I data, the controller 30 calculates a compensated value at a compensated value calculation section 28 based on the respective pieces of data. The resulting compensated values are each conveyed to a filter section 21, a factor section 22, and a CFO compensated signal generation section 27.

The controller 30 estimates the value hat $\epsilon_p$ of the CFO and the value hat d of the CDO, which are contained in the received complex data, based on the I data and the Q data by calculating them from Equation (100) and Equation (14). Then, the controller 30 outputs a compensated value for cancelling the estimated CFO and DCO. The compensated CFO value is $\exp(-j2\pi k \text{ hat } \epsilon_p/N)$ for the kth piece of the received complex data. On the other hand, the compensated DCO value is (–hat d). Note that the hat $\epsilon_p$ is a normalized angle, and the hat d is a complex number.

On the other hand, the I data and the Q data are added together with the estimated value of DCO subtracted therefrom, allowing only the estimated CFO value to be frequency shifted. FIG. 2 shows these steps in such a hardware-like manner that the addition is performed by an adder 22, the subtraction of the estimated value of DCO is carried out by a subtractor 23, and the phase shift corresponding to the CFO is produced by the multiplier 24. However, software may also be employed to carry out these steps. Note that the frequency shift to cancel the estimated CFO value means to multiply the kth received complex data by the $\exp(-j2\pi k \text{ hat } \epsilon_p/N)$. Note that the hat $\epsilon_p$ can be expressed in terms of a specific frequency as $\Delta f/f_0$, where $f_0$ is the subcarrier frequency band. The compensated received complex data is obtained as a convolution of the transmitted data g(n) and the channel response.

Figure 3:
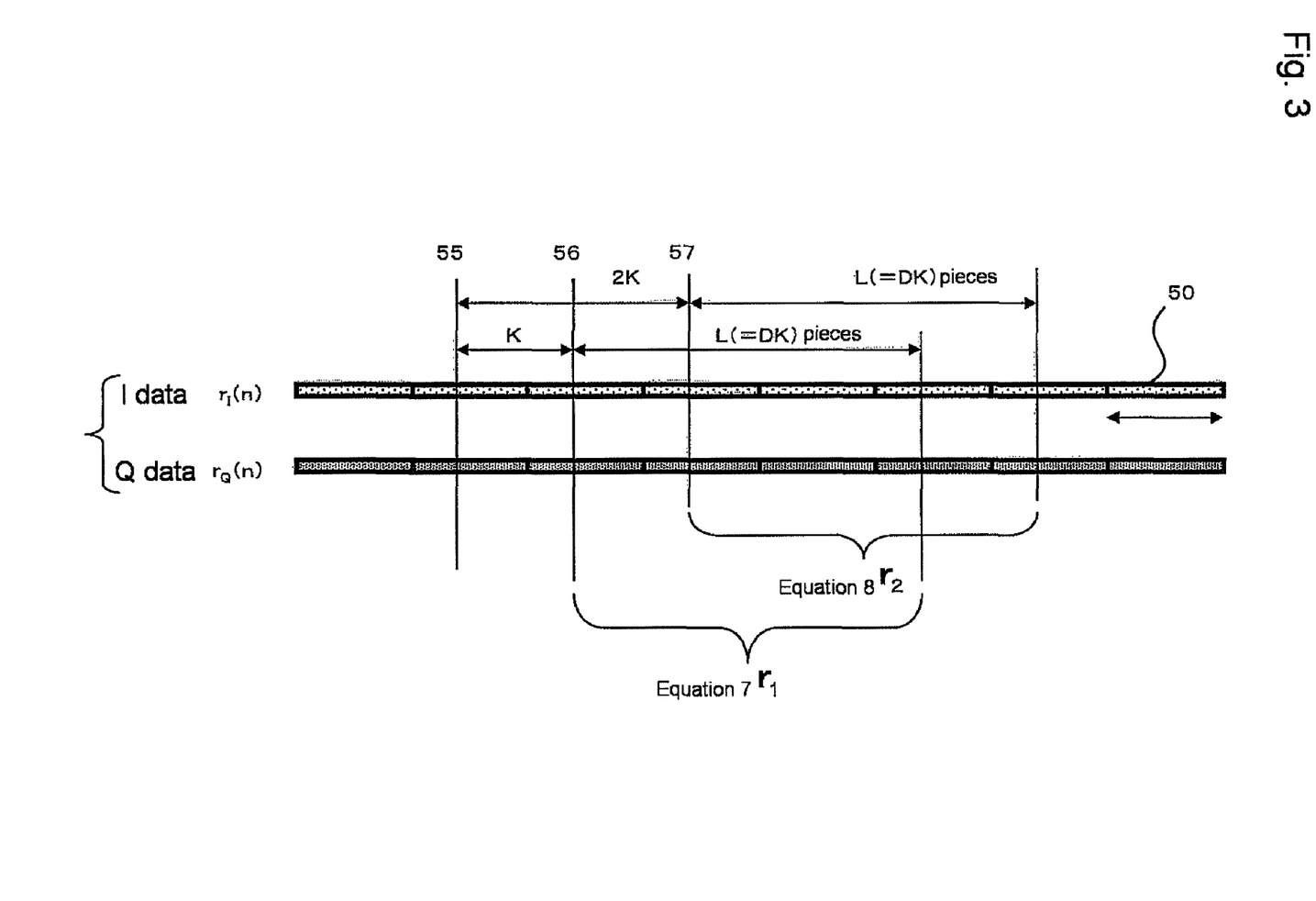
FIG. 3 is a view illustrating a data structure for determining a compensated value according to the present invention.

Now, a description will be made in more detail to the processing by the compensated value calculation section. FIG. 3 shows the array of the pilot signal received in the digitized I data and Q data. The pilot signal has a plurality of symbols 50 present therein. Assume that one symbol has K samples. The compensated value calculation section 28 starts to acquire data at any position of the pilot signal. Here, the data refers to individual sample.

The invention is not limited to a particular timing to start acquiring data. However, it is necessary to be capable to acquire at least (D+1)K or more pilot symbols.

For both the I data and the Q data, L pieces of data is acquired starting from the Kth data 56 from the data acquisition point 55 in the pilot signal, while L pieces of data is also acquired starting from the 2Kth data 57. Here, L is the number of samples in DK pilot symbols. D is a design value and an integer of two or greater. Typically, it is sufficiently 2 to 3. In other words, (2K+L) pieces of the received complex data starting from the data acquisition point 55 are used, among which (K+L) pieces of the received complex data are acquired.

Then, the first L pieces of the acquired received complex data (the first data is located at the (K+1)th position from the acquisition point 55) is considered as the vector $r_1$ (Equation (7)), and the L pieces starting from the Kth data is as the vector $r_2$ (Equation (8)). These vector $r_1$ and vector $r_2$ are a complex number with the real part of $r_I(k)$ and the imaginary part of $r_Q(n)$. Accordingly, in the operational processing of the received complex data, the $r_Q(n)$ data is treated in the same manner as it is multiplied by the imaginary unit j. Note that FIG. 2 shows that the control section 30 includes the multiplier 25 that multiplies $r_Q(n)$ by the imaginary unit j, in order to explicitly indicate that the received complex data is operated as a complex number.

When vectors are acquired, these two groups of data make it possible to immediately determine the CFO estimated value hat $\epsilon$ from Equation (100). Likewise, the DCO estimated value hat d can be determined from Equation (14). the DCO estimated value may also be determined from Equation (102).

Once the CFO and DCO estimated values are determined, it is possible to obtain data whose CFO and DCO have been cancelled in the received complex data. More specifically, assuming that the received complex data of the received n pieces of data is r(n), the hat d is subtracted from all the elements of r(n), thereby allowing the DCO to be compensated for. It is also possible to compensate for the CFO by multiplying r(n) by the following matrix from the left-hand side.

[Equation 45]

$$\Gamma(-\hat{\epsilon}_p) = \text{diag}(1, e^{-j2\pi \hat{\epsilon}_p 1/N}, \ldots, e^{-j2\pi \hat{\epsilon}_p (N-1)/N}) \quad (104)$$

Where diag represents a diagonal matrix.

A description will now be made to the determination of DCO from Equation (102). Assuming the inverse Fourier transform matrix is the matrix $F_N$, then the matrix $F_N$ is expressed as below.

[Equation 46]

$$F_N = \frac{1}{\sqrt{N}} \begin{bmatrix} 1 & e^{j\frac{2\pi \cdot 1 \cdot 0}{N}} & \cdots & \cdots & e^{j\frac{2\pi \cdot (N-1) \cdot 0}{N}} \\ 1 & e^{j\frac{2\pi \cdot 1 \cdot 1}{N}} & & & e^{j\frac{2\pi \cdot (N-1) \cdot 1}{N}} \\ \vdots & & \ddots & & \vdots \\ \vdots & & & \ddots & \vdots \\ 1 & e^{j\frac{2\pi \cdot 1 \cdot (N-1)}{N}} & \cdots & \cdots & e^{j\frac{2\pi \cdot (N-1) \cdot (N-1)}{N}} \end{bmatrix}$$

Each column vector of the matrix corresponds to a subcarrier. In this context, those subcarriers carrying null are extracted as a matrix V. The matrix V has N elements in the vertical direction, and as many elements as the number of null subcarriers in the horizontal direction. The matrix $\Gamma^H(\epsilon)$ (=matrix $\Gamma(-\epsilon)$) is obtained from Equation (104) above.

The vector x and the vector y according to Equation (103) can be determined readily without having to find an inverse matrix by transposing the matrix elements. The hat $\epsilon_p$ can be obtained as CFO. Accordingly, the vector x and the vector y can be easily determined by the transposing of the elements and the multiplication of matrices.

Furthermore, as already shown, letting the vector x being simply denoted as "x", the quasi inverse matrix of x is $(x^H x)^{-1} x^H$. Since the $(x^H x)$ is scalar, the quasi inverse matrix of the vector x can be determined as the scalar and the Hermitian matrix of the vector x. Accordingly, the DCO according to Equation (102) can be obtained only by a vector multiplication.

4. Simulation

This section describes the simulation to show the performance of the proposed method for simultaneous estimation of CFO and DCO. The OFDM system to be simulated has N=64 subcarriers and used 52 subcarriers to transmit gray coded 64QAM signals. The length of a cyclic prefix was Ncp=16. As the PP, we used the short training sequence in the preamble of IEEE 802.11a WLAN.

Here, P (the number of pilot signals)=10, K=16, and M=4. The frequency selective fading channel has five paths along which power is exponentially reduced. The power of the received distortion-free signal was set to one corresponding to SNR=1/$\sigma^2$z, while the power of DCO was fixed to the square of the absolute value of d=0.25.

Figure 4:
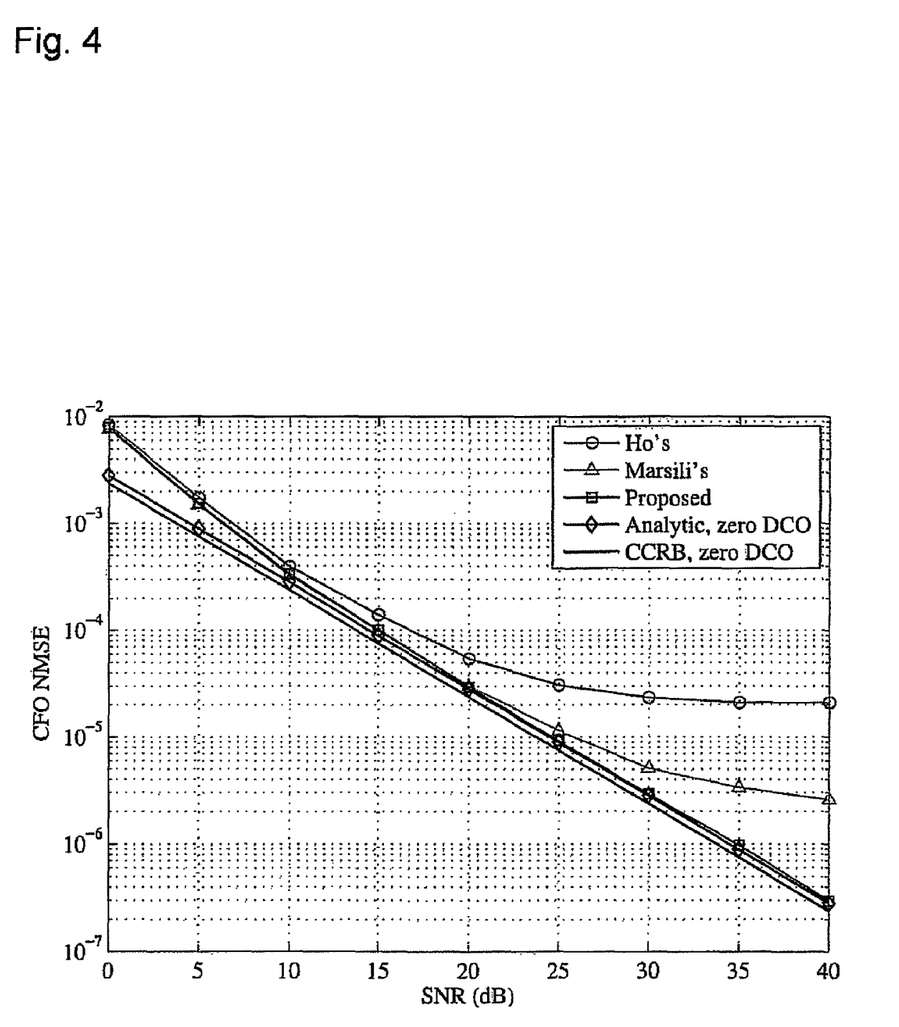
FIG. 4 is a graph illustrating a comparison between values according to a conventional method and the least-squares error (NMSE) of CFO.

The proposed estimation method was compared to Ho's estimation method in Non-Patent Document 3 and Marsili's estimation method in Non-Patent Document 4 using the same last L+K=64 samples of the PP. In Marsili's estimation method, a linear estimation was made to estimate the DCO under the assumptions that the CFO is uniformly distributed in the interval of (−εBLUE, εBLUE) and the SNR is 20 dB. Then, the estimated DCO value was subtracted from the pilot signal, and then the CFO was estimated based on the correlation. The normalized CFO least-squares errors (NMSE) defined by $E[(\epsilon\text{-hat }\epsilon)^2]$ were compared as shown in FIG. 4. Both Ho's and Marsili's estimation methods cannot completely eliminate the influence of DCO. It can be thus seen that there is an error floor with the error estimation performance. On the other hand, the proposed CFO estimation method exhibits the same excellent estimation performance as in the absence of DCO.

Figure 5:
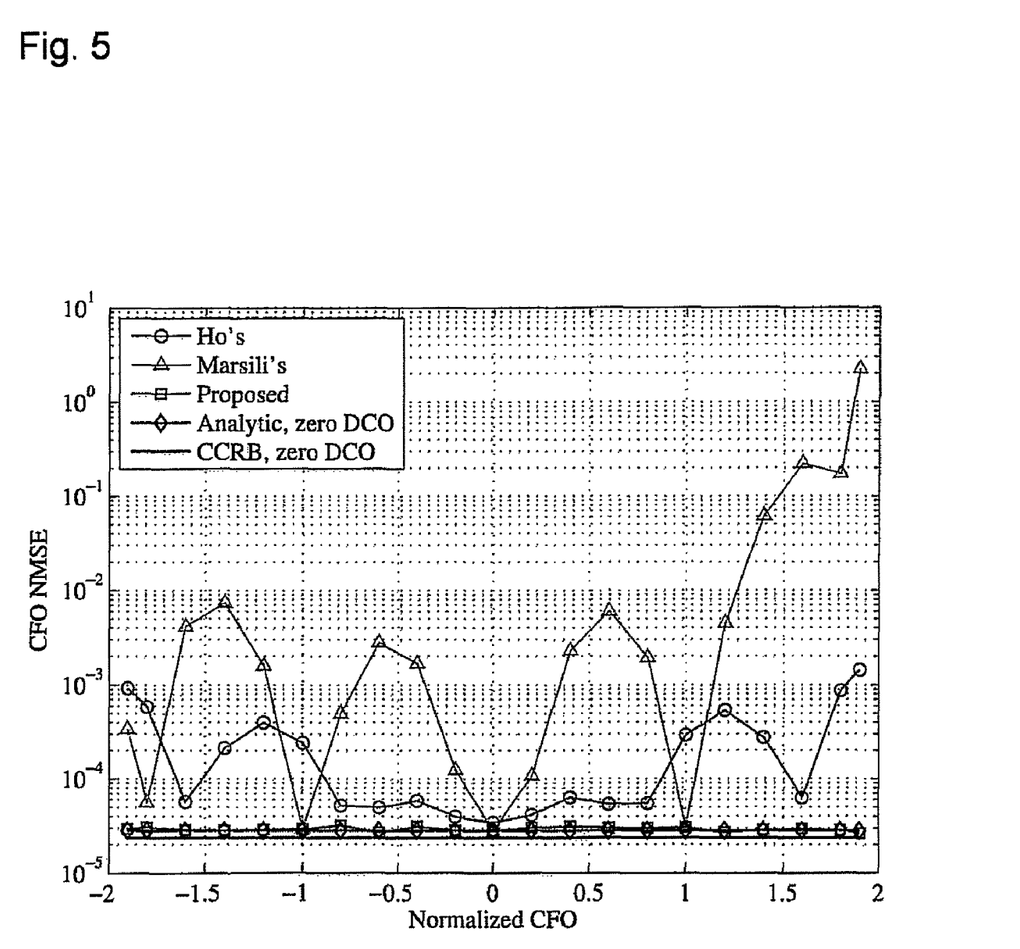
FIG. 5 is a graph illustrating the NMSE of CFO.
Figure 6:
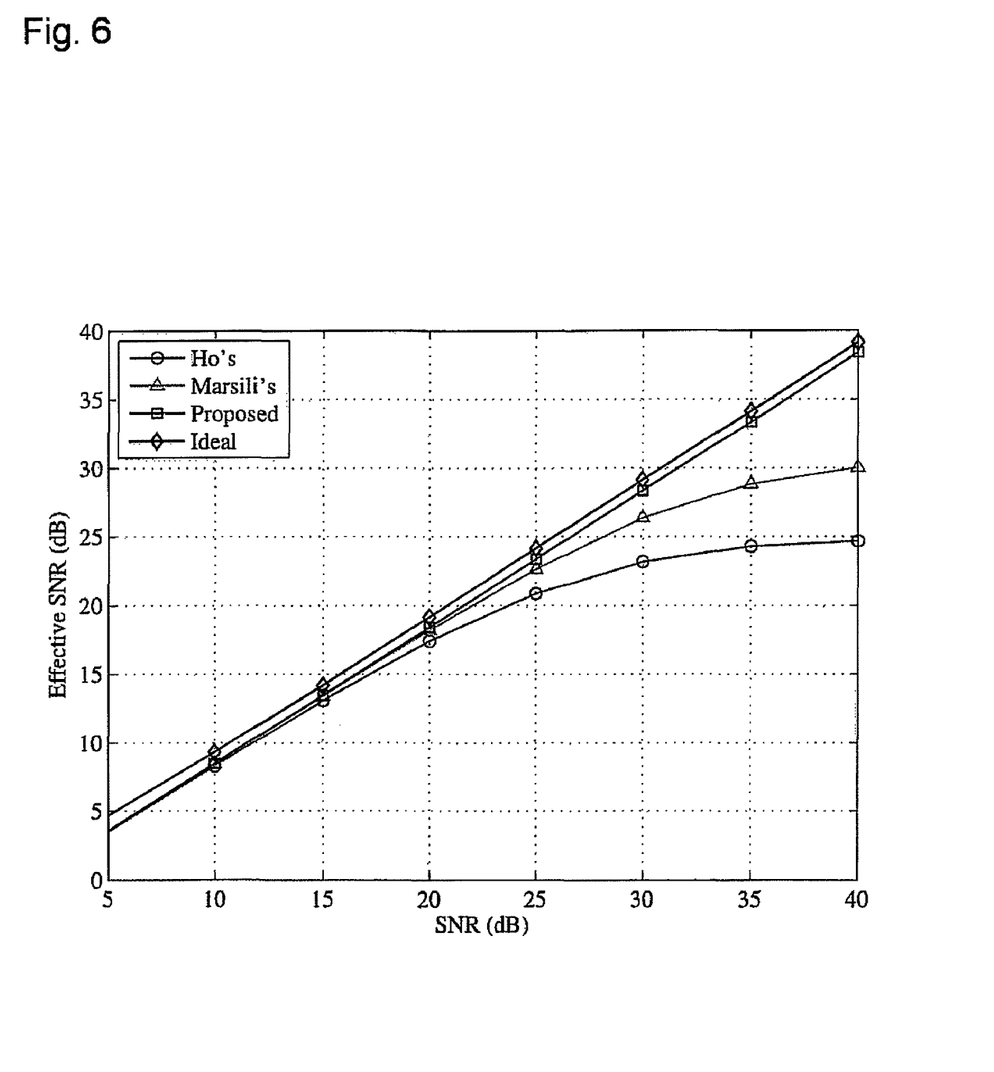
FIG. 6 is a graph illustrating a result of an effective SNR.
Figure 7:
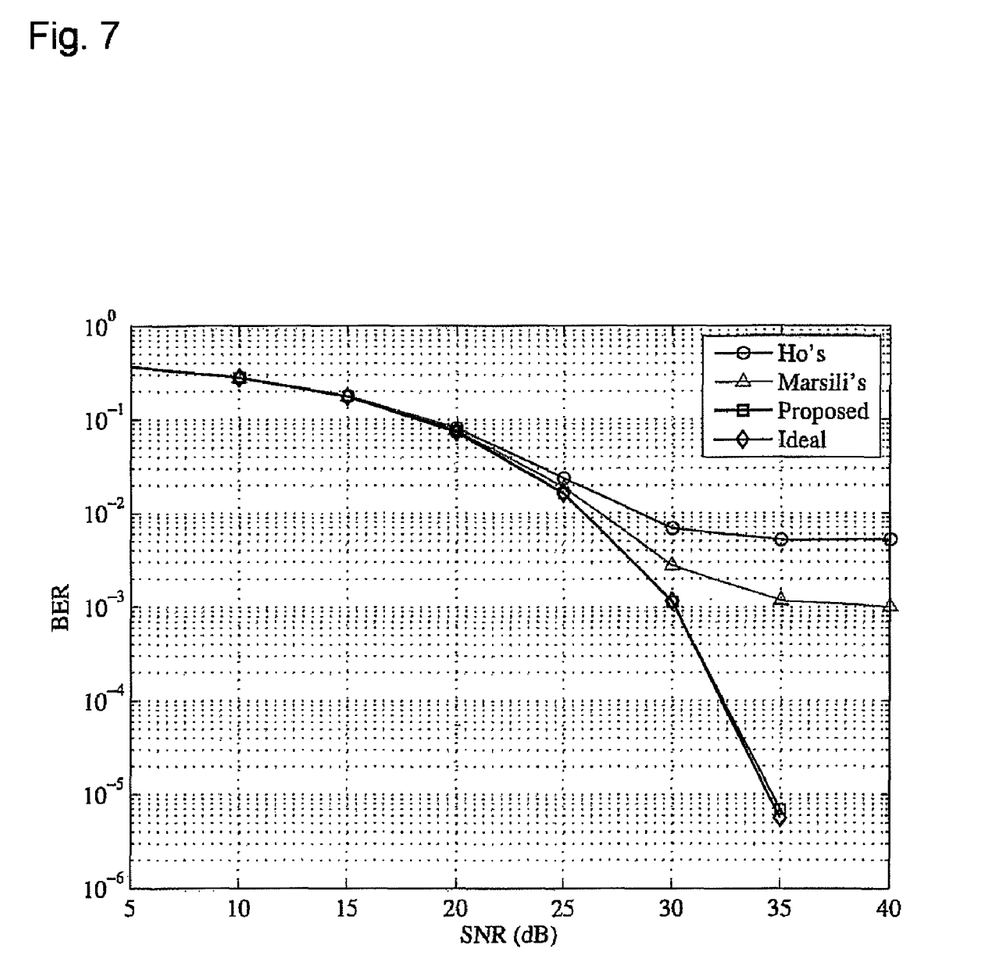
FIG. 7 is a graph illustrating a result of a bit error rate (BER).

FIG. 5 shows a CFO NMSE. The performance of Ho's and Marsili's estimation methods drastically varies according to the value of CFO; however, it can be seen that the proposed estimation method holds the optimum performance through the range of CFO estimation. Finally, the total reception performance can be measured using the result of the effective SNR of FIG. 6 and the bit error rate (BER) of FIG. 7. Here, the TDA-based DCO estimation employed Ho's estimation method. As had been expected, the estimation method proposed by the present invention achieved satisfactory estimations of CFO and DCO, and has advantages over the two conventional approaches.

So far, the present invention has been discussed with reference to the potential properties of the PP in the simultaneous presence of CFO and DCO and a suggested novel method for simultaneous estimation of CFO and DCO. When compared with the conventional methods, the estimation of CFO by the proposed estimation method is bias free and capable of achieving the same performance as in the absence of DCO. The results of simulations proved the appropriateness and advantage of the proposed estimation method.

Industrial Applicability

The present invention is applicable to electronic communication devices, and in particular, to a receiver for transmitting and receiving according to the OFDM scheme.

The invention claimed is:

1. A method for estimating an amount of distortion, comprising:
    receiving a transmitted signal to acquire a received signal;
    demodulating the received signal to acquire a demodulated signal;
    converting the demodulated signal into a digital signal;
    acquiring, as acquired data, (K+L) pieces of data from a portion corresponding to a pilot signal of the digital signal, where K is a number of samples included in one pilot signal symbol of the received signal, and L is DK with D being a predetermined integer value; and
    determining an estimated value of a carrier frequency offset based on a first Equation, where vector $r_1$ represents L pieces of data starting from a beginning of the acquired data, vector $r_2$ represents L pieces of data starting from (K+1)th data from the beginning of the acquired data, and the first Equation is:

$$\Delta f = \frac{f_s}{2\pi K} \arg\{R_p\},$$

where Rp is a complex number derived from a second Equation, fs is a sampling frequency, and the second Equation is:

$$R_p = \frac{1}{L} r_1^H r_2 - \frac{1}{L^2} r_1^H 11^T r_2,$$

where vector 1 is an (L×1) vector with all elements being one, H denotes a Hermitian matrix, and T denotes a transpose matrix.

2. A method for estimating an amount of distortion, comprising:
   receiving a transmitted signal to acquire a received signal;
   demodulating the received signal to acquire a demodulated signal;
   converting the demodulated signal into a digital signal;
   acquiring, as acquired data, (K+L) pieces of data from a portion corresponding to a pilot signal of the digital signal, where K is a number of samples included in one pilot signal symbol of the received signal, and L is DK with D being a predetermined integer value; and
   determining an estimated value of a direct-current offset based on an Equation, where vector $r_1$ represents L pieces of data starting from a beginning of the acquired data, vector $r_2$ represents L pieces of data starting from (K+1)th data from the beginning of the acquired data, and the Equation is:

$$\hat{d} = \frac{r_1^H r_1 1^T r_2 - r_1^H r_2 1^T r_1}{(L r_1^H - r_1^H 1 1^T)(r_1 - r_2)},$$

wherein vector 1 is an (L×1) vector with all the elements being one, H denotes a Hermitian matrix, and T denotes a transpose matrix.

3. A reception method, comprising:
   receiving a transmitted signal to acquire a received signal;
   demodulating the received signal to acquire a demodulated signal;
   converting the demodulated signal into received complex data;
   compensating for an estimated direct-current offset value determined according to claim 2; and
   compensating for an estimated carrier frequency offset value determined based on a second Equation, where, the second Equation is:

$$\Delta f = \frac{f_s}{2\pi K} \arg\{R_p\},$$

where $R_p$ is a complex number derived from a third Equation, $f_s$ is a sampling frequency, and the third Equation is:

$$R_p = \frac{1}{L} r_1^H r_2 - \frac{1}{L^2} r_1^H 1 1^T r_2.$$

4. A receiver, comprising:
   an antenna for receiving a transmitted signal having a pilot signal portion to acquire a received signal;
   an amplifier connected to the antenna for outputting the received signal;
   a complex demodulator connected to the amplifier for demodulating the received signal to acquire a demodulated received signal;
   a switch connected to the complex demodulator for sampling the demodulated received signal and outputting received complex data; and
   a controller connected to the switch for receiving the received complex data and outputting compensated received data obtained by removing a carrier frequency offset and a direct-current offset from the received complex data, wherein the controller acquires L pieces of data starting from (K+1)th data of a pilot signal as a vector $r_1$, and L pieces of data starting from (2K+1)th data of the pilot signal as a vector $r_2$,
   the controller determines a compensated carrier frequency offset value based on a first Equation,
   the controller determines a compensated direct-current offset value based on a second Equation,
   the controller compensates the received complex data using the compensated direct-current offset value to acquire compensated received complex data and compensates the compensated received complex data using the compensated carrier frequency offset value, thereby determining the compensated received data,
   the first Equation is:

$$\Delta f = \frac{f_s}{2\pi K} \arg\{R_p\},$$

where $R_p$ is a complex number and derived from a third Equation, $f_s$ is a sampling frequency, and K is a number of samples in one symbol,
   the third Equation is:

$$R_p = \frac{1}{L} r_1^H r_2 - \frac{1}{L^2} r_1^H 1 1^T r_2.,$$

where the vector 1 is an (L×1) vector with all elements being one, H denotes a Hermitian matrix, and T denotes a transpose matrix, and
   the second Equation is:

$$\hat{d} = \frac{r_1^H r_1 1^T r_2 - r_1^H r_2 1^T r_1}{(L r_1^H - r_1^H 1 1^T)(r_1 - r_2)}.$$

* * * * *